Figure 1:
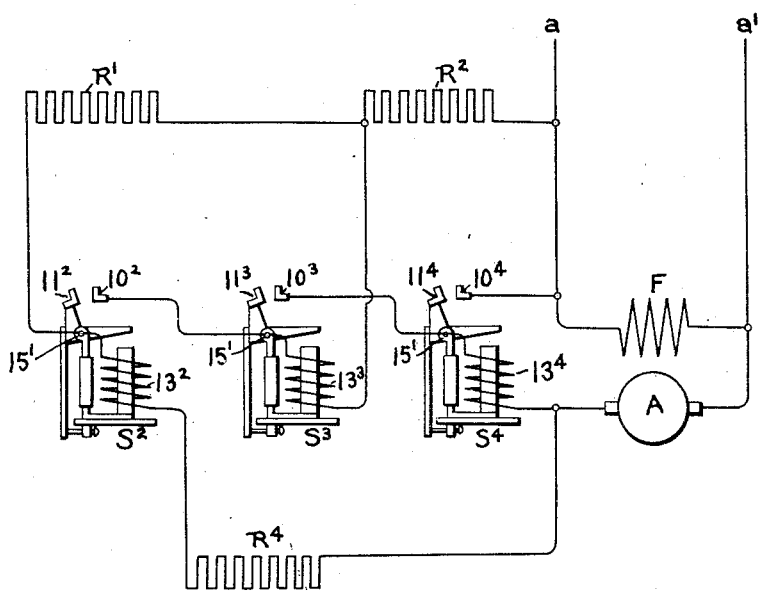

E. J. MURPHY.
MOTOR CONTROL SYSTEM.
APPLICATION FILED MAY 9, 1911.

1,214,355.

Patented Jan. 30, 1917.
3 SHEETS—SHEET 1.

WITNESSES:

INVENTOR:
EDWIN J. MURPHY,
BY
HIS ATTORNEY.

E. J. MURPHY.
MOTOR CONTROL SYSTEM.
APPLICATION FILED MAY 9, 1911.
1,214,355. Patented Jan. 30, 1917.
3 SHEETS—SHEET 2.
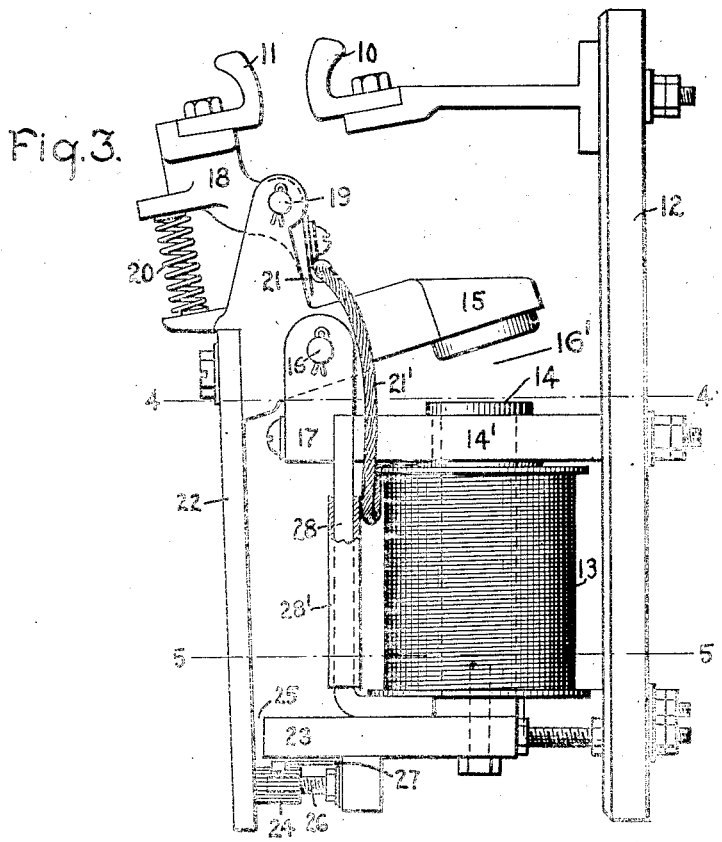
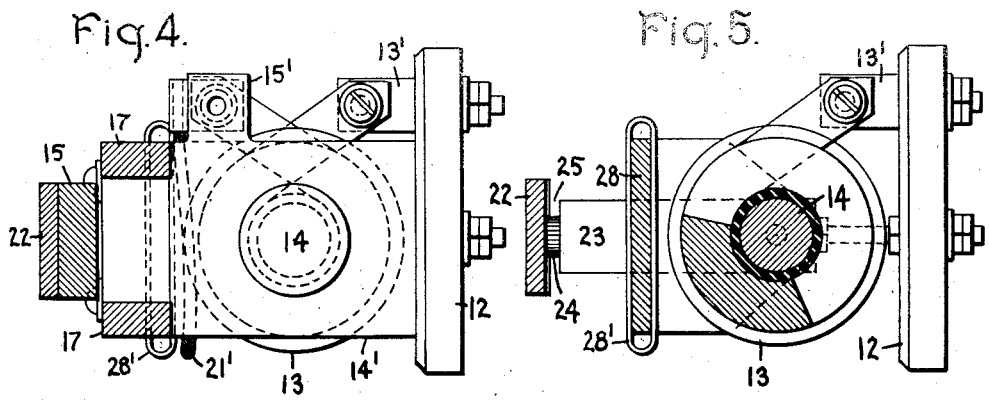
WITNESSES:
Marcus L Byng.
J. Ellis Glen
INVENTOR:
EDWIN J. MURPHY,
BY Allen S. Davis
HIS ATTORNEY.

E. J. MURPHY.
MOTOR CONTROL SYSTEM.
APPLICATION FILED MAY 9, 1911.
1,214,355.
Patented Jan. 30, 1917.
3 SHEETS—SHEET 3.
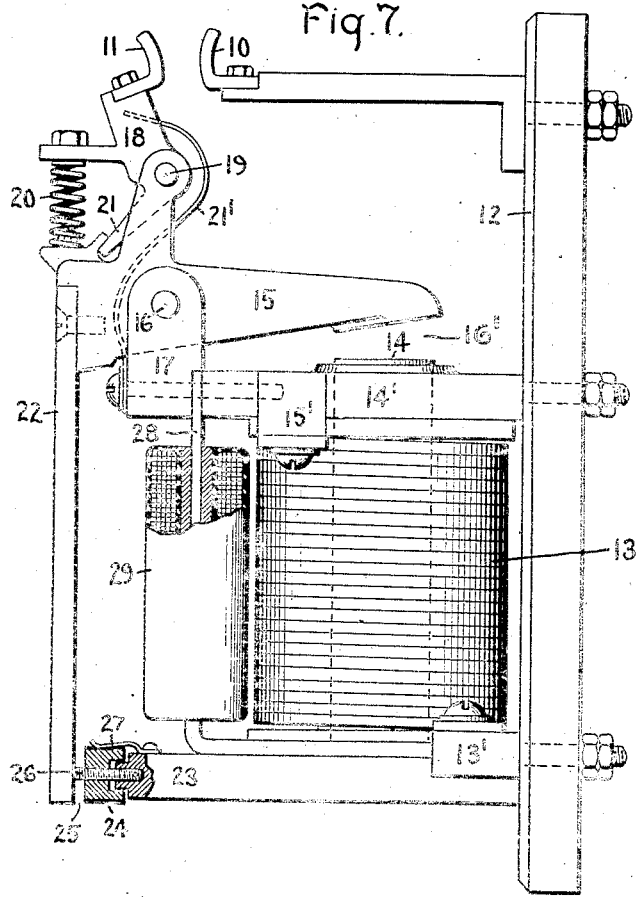
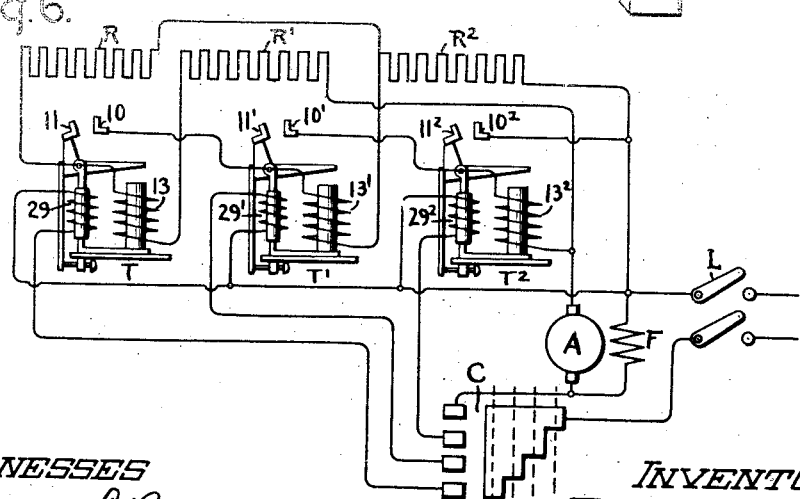
WITNESSES
Marcus L. Byng.
J. Ellis Glen
INVENTOR:
EDWIN J. MURPHY,
BY
HIS ATTORNEY.

ly well adapted for use in the control of electric motors. In said application
UNITED STATES PATENT OFFICE.

EDWIN J. MURPHY, OF SCHENECTADY, NEW YORK, ASSIGNOR TO GENERAL ELECTRIC COMPANY, A CORPORATION OF NEW YORK.

MOTOR-CONTROL SYSTEM.

1,214,355. Specification of Letters Patent. Patented Jan. 30, 1917.

Application filed May 9, 1911. Serial No. 626,065.

*To all whom it may concern:*

Be it known that I, EDWIN J. MURPHY, a citizen of the United States, residing at Schenectady, county of Schenectady, State of New York, have invented certain new and useful Improvements in Motor-Control Systems, of which the following is a specification.

This invention relates to the control of electric circuits and has for its object the provision of means whereby an electric circuit may be effectively controlled in a reliable, simple and efficient manner.

This application is a continuation in part of my previous application, Serial No. 608,652, filed February 15, 1911. In this previous application I have disclosed an electromagnetic device which is inactive when the excitation is high and becomes active upon a lower excitation. While this device is capable of various applications in electric circuits, I have found it to be particularly well adapted for use in the control of electric motors. In said application I have also disclosed a system of motor control embodying a plurality of successively closing electromagnetic switches for controlling the motor circuit having actuating windings adapted to be connected in the controlled circuit, the arrangement being such that when a switch closes, the winding of a succeeding switch is energized by the current in the controlled circuit and the windings of all the switches except the last to close are subsequently deënergized so that only the last switch remains closed. It is this system which forms the subject matter of my present application. In the embodiment of my invention herein illustrated the actuating windings of the several switches are successively connected in the armature circuit and the connections between the several actuating windings and the resistance sections are so arranged that each succeeding switch in closing deënergizes the winding of the preceding switch so that finally the last switch only will be closed. This I may, and preferably do accomplish without resorting to the use of interlocking or auxiliary switches.

For the purpose of producing a suitable time interval between the closing of the successive switches in a system of the character above described, I prefer to construct each of the switches as described above, so that each switch member will be held from closing by a magnetic force when the current is high and will be permitted to be closed by an opposing force when the current falls to a predetermined value, although so far as the invention of the system is concerned, it will be obvious that other means might be employed for producing this interval, or that no means of this character need be employed unless such interval is considered desirable.

Figure 2:
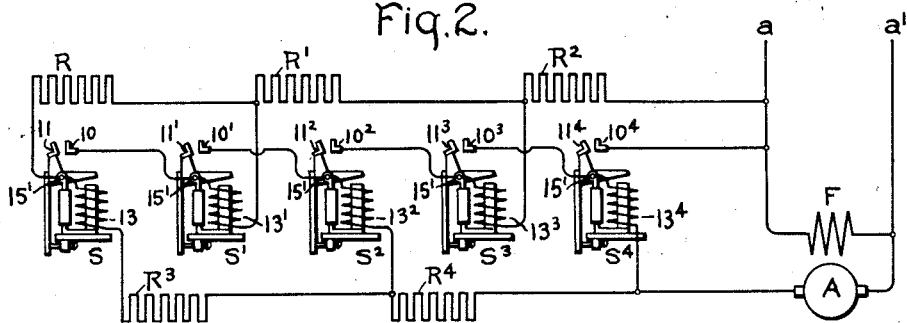

Referring to the drawings, Figure 1 is a diagrammatic view showing my system of motor control; Fig. 2 is a similar view in which a larger number of sections of resistance is employed; Fig. 3 shows a form of electromagnetic switch suitable for use with my control system; Fig. 4 is a section on the line 4—4 of Fig. 3; Fig. 5 is a section on the line 5—5 of Fig. 3; Fig. 6 is a modified form of my system of control; and Fig. 7 shows an electromagnetic switch suitable for use in this system.

Referring first to Figs. 1 and 2, in which I have shown my system of motor control, A represents the armature and F the shunt field of an electric motor. In Fig. 1 I have shown my system employing three sections of resistance for starting the motor, while in Fig. 2 I have shown the system as employing five sections. It will be obvious, of course, that any suitable number of sections may be employed without departing from the spirit of my invention. I shall describe the system with particular reference to Fig. 2. The starting resistance in this case is composed of five sections divided into two groups, sections R, R' and R² constituting one group, while sections R³ and R⁴ constitute the other group. Switches S, S', S², S³ and S⁴ are arranged to cut sections of resistance out of the motor circuit consecutively. It will be seen that the fixed contact 10, 10', etc., of each switch is connected with the movable switch member 11', 11², etc., of the next succeeding switch at the terminal 15', thereby also connecting with the actuating coil 13', 13², etc., of the next succeeding switch. It will also be noted that the actuating coil in each case has one terminal connected with its own movable switch member while the other terminal is connected with a section of resistance. Taking the switches in their order, the first magnet winding 13 is connected with resistance section R³ in one group, while the next winding 13' is connected with resistance section R' in the other group, and so on, being successively connected with alternate groups.

The operation of the system will be as follows: When voltage is applied, current will pass from the main a', armature A, resistance R⁴, R³, winding 13 of the electromagnetic switch S, resistances R, R' and R², back to the main a. This causes the motor to start with all the resistance in circuit. The switches S, S', etc., are preferably provided with means for preventing the switch member from closing immediately upon the energization of the actuating coils. Various means may be employed for accomplishing this result but the particular means employed in this case will be described hereinafter. At this point, however, it is sufficient to state that the switch member 11 will not close immediately on the energization of the coil 13 but will be closed only when the current falls to a predetermined safe value. When the motor armature rises in speed, the current will fall, and when it reaches the predetermined value due to the increased counter-electromotive force of the motor, the switch S will close. When this closes, the section of resistance R will be short circuited and at the same time the winding 13' of the succeeding switch S' will be energized. The direction of current will now be as follows: From the main a' to armature A, resistances R⁴, R³, winding 13, contacts 11, 10, winding 13', resistances R' and R² back to the main a. The short circuiting of the resistance R increases the current momentarily so that the switch S' will not operate until the motor speeds up to reduce the current. When the current again falls to the predetermined value the switch S' will close. The closing of this switch short circuits the resistance R³ and winding 13 through the windings 13² and 13'. These windings 13' and 13² being of low resistance, the switch S will open. The short circuited resistance section R³ then increases the current momentarily and the switch S² will not immediately close. When it does close, however, it short circuits the resistance section R' and the winding 13', the direction of current being as follows: from the main a', armature A, resistance R⁴, winding 13², contacts 11² and 10², winding 13³, resistance section R², back to the main a. After the motor speeds up so as to reduce the momentary rush of current due to the short circuiting of the resistance R', switch S³ will close, cutting out section of resistance R⁴ and winding 13². In a similar manner, switch S⁴ will be closed and short circuit resistance R² so that the motor will operate with the armature in series with the winding of the switch S⁴. The motor will therefore be running with the switch S⁴ only closed, the remaining switches S, S', S², etc., being open. Upon failure of voltage due to any cause, switch S⁴ will open and cannot be again closed until the other switches are closed in the order stated. This system provides a system of motor control in which the interlocking switches and auxiliary coils previously employed for causing the sequence of operation of the switches are dispensed with. The switches which I have employed consist of a single series winding and a single switch member, but it is obvious that my motor control system is in no sense limited to the particular type of switch employed, since any suitable means for producing a time interval between the closing of the switches may be provided.

In Figs. 3 to 5 I have shown in detail the particular type of switch employed with the above described system of control.

Referring to Figs. 3 to 5, 10 represents a fixed contact and 11 a coöperating movable contact mounted upon an insulating base 12 of slate or soapstone. An electromagnet 13 having a core 14 of magnetic material is mounted upon the base below the contacts. The core 14 passes through a plate 14' of non-magnetic material, preferably of brass or copper. This is secured to the base, and a lug 15' constituting a terminal forms a part of the brass plate. One end of the coil winding is connected to lug 15' and the other end is connected to terminal 13', connection being made to these terminals and to contact 10 from the back of the slate base as shown. Coöperating with the magnetic core 14 is a member 15 of magnetic material pivoted at 16 to an iron support 17. This support 17 is secured to the brass plate 14', and is in conductive relation with the brass frame and terminal block. The switch member is in the form of a bell crank lever having a bracket 18 pivoted at 19 for carrying the movable contact 11. This bracket 18 is movable on the pivot 19 to a small extent by reason of the compression spring 20 which forces the projecting end 21 against the bracket. This permits the contact member 12 to move sufficiently when it is forced against the member 11 to furnish a wiping contact. The contact 11 is electrically connected with the supporting member 17 by a copper cable 21'. Secured to the member 15 is a bar 22 of magnetic material which projects downward so as to coöperate with the polepiece 23 of the magnet. This polepiece is in engagement with the core 14 so as to form part of the magnetic circuit through the core. The member 15, together with the bar 22, constitute in effect a single armature for the magnet comprising the core 14 and the polepiece 23, and the weight is so distributed that the parts normally rest in the position shown in Fig. 1. In this position the bar rests against the brass nut 24 which holds the armature bar 22 out of engagement with the polepiece 23 so as to leave a small air gap at 25. The nut 24 is adjustable on screw 26 so as to vary the air gap 25 and the spring 27 acts to hold the nut in any position to which it is turned. The switch member thus has two armature portions 22 and 15, the former coöperating with the polepiece 23 while the latter coöperates with the core 14.

In order to produce a magnetic force between the polepiece 23 and armature 22 across the air gap 25 sufficient to hold the switch from closing against the pull of the core 14 upon the armature portion 15 when the current is high and release it when it is low, I provide a magnetic element 28 which acts as a shunt for the flux of the magnet. This element 28 is in shunt to the air gap 25 and is of limited magnetic carrying capacity. It is secured at one end to the brass plate 14' and at the other end to the pole piece 23. The flux of the magnet thus has two parallel paths, one from the core 14 through shunt 28, iron support 17, arm 15, and air gap 16' while the other path is through polepiece 23, across the air gap 25, armature 22, arm 15 and air gap 16'. The shunt 28 is shown wide so as to act as a screen. When the current through the magnet winding is relatively low and the flux of the magnet correspondingly low, the magnetic element 28 shunts a relatively large portion of the flux around the gap 25 and makes the gap relatively inactive. When the flux is high, due to a higher current, the shunt becomes more highly magnetized and no longer shunts so large a portion of the flux. This causes the air gap 25 to become more active. In other words, when the winding 13 is energized at a relatively high current, two opposing magnetic forces are exerted upon the switch member, the stronger or more effective force acting on armature 22 tending to keep the switch open and the weaker or less effective force acting upon the armature 15 tending to close it. When the current is diminished, the stronger magnetic force is weakened by the magnetic shunt path which is now less highly magnetized. While the flux across the gap 16' decreases as the total flux decreases, the flux across the gap 25 decreases much more rapidly, since the flux is approaching the point at which the shunt will carry a very much greater proportion of the total flux. When the current falls to a predetermined value, the pull on the armature 15 overcomes the pull on the armature 22 and the switch is closed. As shown in the drawings, the armature 22 is longer than the arm 15 so as to give it a greater leverage. The magnetic force upon the armature 22 tending to hold the switch open may thus be considerably less than that upon the armature 15 tending to close it and still the switch will be held open. By increasing the air gap 25, the point at which the armature 22 is released may be adjusted. The current in the winding 13 in rising to the higher value at which the switch is held open by the armature portion 22, passes through the lower value at which the switch will close. The closing of the switch at this point may be guarded against under some conditions by suitable design and proportioning of the parts, but the operation may be greatly improved, as before stated, by providing means for introducing a time lag. One way of accomplishing this I have shown in the drawings. This consists of a short circuit around the shunt. As shown in the drawings, this consists of a ring or band of copper 28' or similar non-magnetic material of low electrical resistance surrounding the shunt. A transient current of high value is thus induced in the ring which temporarily opposes the increase of the flux in the shunt path; that is, it renders the shunt temporarily inactive, thereby causing the air gap to be sufficiently active to hold the switch open while the current is passing through the lower value at which it is adjusted to close. The net result is that when relatively high current passes through the magnet winding the switch will be held open and when the current falls to a predetermined value it will be closed. The relative value of the forces tending to attract the armature 15 toward the end of the core 14 and the armature 22 against the end of the polepiece 23 may be adjusted by varying the relative areas of the air gaps at these two points, in accordance with well-known laws of electromagnetic action.

Whatever the character of the switches employed in my system, it is in some cases desirable that means be provided whereby the closing of the switches may be regulated by the operator; that is, it is desirable to have control by the operator in addition to the automatic control. This is particularly desirable where the automatic control is of the current limit type. This result may be accomplished in various ways. In Fig. 7 I have shown one method of doing this in connection with the specific form of switch above described. This consists of providing an additional winding which holds the switch open while the coil is energized. In this case the coil which is a shunt coil is mounted upon the shunt 28. The arrangement is such that when the coil 29 is energized the shunt 28 is magnetized in the opposite direction to that in which it is energized in the main winding. The flux across the air gap 25 will be increased to such a point that the switch will be held open under all conditions so long as the coil is energized.

In Fig. 6 I have shown a plurality of these switches in a motor control system. It will be seen that it differs from Fig. 2 only in that the controller C is provided for successively controlling the winding 29, 29' and 29². When the line switch L is closed and the controller C is turned to the first position, the actuating winding of the switch T will be energized through the armature A and the resistances R, R' and R². When the current falls to a predetermined value, the switch T will be in a condition to close but will be restrained by the energization of the coil 29. When, however, the controller is moved to the second position the coil 29 will be deënergized and the switch T will close. As before, the closing of the switch T energizes the winding of the switch T' and this latter switch will close when the current falls to a predetermined value and the controller has been moved to the next position. In this way, when the controller is moved to the fourth position the winding 29² will be deënergized and the switch T² will be closed, thus throwing the motor armature across the line in series with the winding of switch T².

It will be seen that I have provided a system of control embodying a plurality of electromagnetic switches in which the closing of one switch to cut out a section of resistance simultaneously energizes the next succeeding switch and deënergizes the preceding switch, this being done without the use of auxiliary or interlocking switches.

While I have described my invention as employing a specific type of electromagnetic switch and as operating in a specific manner, it should be understood that I do not limit my invention thereto, since various modifications thereof will suggest themselves to those skilled in the art without departing from the spirit of my invention, the scope of which is set forth by the annexed claims.

What I claim as new and desire to secure by Letters Patent of the United States is:—

1. The combination with an electric motor, of a resistance in the circuit thereof, a plurality of electromagnetic switches each comprising an actuating winding and a switch member actuated thereby for successively cutting out sections of resistance, and connections whereby the closing of each switch to cut out a section of resistance simultaneously energizes a succeeding magnet winding and deënergizes a preceding magnet winding.

2. The combination with an electric motor, of a resistance in the circuit thereof, a plurality of electro-magnetic switches each having a winding in series with the motor and a switch member arranged to be closed by said winding to cut out a section of resistance, and connections whereby each switch member in closing to cut out a section of resistance simultaneously energizes a succeeding magnet winding and deënergizes a preceding magnet winding.

3. The combination with an electric motor, of a resistance in the circuit thereof, a plurality of electromagnetic switches each comprising a single actuating winding and a single switch member actuated thereby for successively cutting out sections of resistance, and connections whereby the closing of each switch to cut out a section of resistance simultaneously energizes a succeeding magnet winding and deënergizes a preceding magnet winding.

4. The combination with an electric motor of a resistance in the circuit thereof and a plurality of electromagnetic switches for cutting said resistance out of circuit each comprising a switch member arranged to be held open when the current in the magnet winding thereof is relatively high and closed when the current falls to a predetermined value, and connections whereby each switch member in closing to cut out a section of resistance simultaneously energizes a succeeding winding and deënergizes a preceding winding.

5. The combination with an electric motor, of a plurality of resistance sections in the circuit thereof divided into groups, a plurality of electromagnetic switches each comprising an actuating winding and a switch member actuated thereby for successively cutting sections of resistance out of the alternate groups, and connections whereby each switch member in closing to cut out a section of resistance simultaneously energizes a succeeding magnet winding and deënergizes a preceding magnet winding.

6. The combination with an electric motor, of a resistance in the circuit thereof, a plurality of electromagnetic switches for successively cutting out sections of resistance, each comprising a switch member arranged to be held open when the current is relatively high and to close when the current falls to a predetermined value, connections whereby each switch member in closing to cut out a section of resistance simultaneously energizes a succeeding magnet winding and deënergizes a preceding magnet winding, and electromagnetic means for controlling the closing of said switch member after the current has fallen to a predetermined value.

7. The combination with an electric motor, of a plurality of resistance sections therefor divided into two groups, a plurality of electromagnetic switches for cutting out sections of resistance each comprising a fixed contact, a movable contact for engaging the same, and a winding for operating said movable member, one terminal of each of the successive windings being connected to a section of the alternate resistance groups while the other terminal is connected with the stationary contact of a preceding switch and with the movable member of its own switch.

8. The combination with an electric motor, of a resistance in the circuit thereof, a plurality of electromagnetic switches for successively cutting out sections of resistance, each comprising a single switch member and a single winding for actuating the same, each switch being provided with means for preventing the closing of the switch member when the current in the winding is relatively high and causing it to close when the current falls to a predetermined value, and connections whereby the closing of each switch member to cut out a section of resistance simultaneously energizes a succeeding magnet winding and deënergizes a preceding magnet winding.

9. The combination with an electric motor, of a plurality of resistance sections therefor divided into two groups, a plurality of electromagnetic switches for cutting out said sections of resistance each comprising a fixed contact, a movable contact member for engaging the same, and a winding for operating said movable member, one terminal of each of the successive windings being connected to the sections of the alternate groups while the other terminal is connected with the stationary contact of the preceding switch and with the movable member of its own switch, and means whereby the movable member of each switch is held open when the current in its winding is high and is closed when the current falls to a predetermined value.

10. The combination with an electric motor, of a plurality of resistance sections therefor divided into two groups, a plurality of electromagnetic switches for cutting out sections of resistance each comprising a fixed contact, a movable contact for engaging the same, and a winding for operating said movable member, one terminal of each of the successive windings being connected to a section of the alternate resistance groups while the other terminal is connected with the stationary contact of one switch and with the movable member of another switch.

11. The combination with an electric motor, of a plurality of resistance sections therefor divided into two groups, a plurality of electromagnetic switches for cutting out said sections of resistance each comprising a fixed contact, a movable contact member for engaging the same, and a winding for operating said movable member, one terminal of each of the successive windings being connected to the sections of the alternate groups while the other terminal is connected with the stationary contact of the one switch and with the movable member of another switch, and means whereby the movable member of each switch is held open when the current in its winding is high and is closed when the current falls to a predetermined value.

12. In a control system a controlled circuit, a series of switches therefor arranged to close in a predetermined order, windings for the switches energized by the current in the controlled circuit, and connections whereby each switch in closing energizes the winding of the next switch to operate and causes the switch which preceded in operation to open.

13. In a control system, a controlled circuit, a series of switches therefor arranged to close in a predetermined order, windings for the switches energized by the current in the controlled circuit, and connections whereby each switch, except the last, in closing energizes the winding of the next switch to operate and each switch except the first causes the switch which preceded in operation to open.

14. In a control system a controlled circuit, a series of switches therefor arranged to close in a predetermined order, windings for the switches energized by the current in the controlled circuit, and connections whereby the first switch in closing energizes a winding of the next switch to operate and the next switch in closing causes the switch which preceded in operation to open.

15. In a control system, a controlled circuit, a series of switches therefor arranged to close in a predetermined order, windings for the switches energized by the current in the controlled circuit, and connections whereby each switch except the last, in closing energizes a winding of the next switch to operate and each switch except the first causes the switch which preceded in operation to open.

16. The combination with an electric motor, of a resistance in the circuit thereof and a plurality of electromagnetic switches for cutting said resistance out of circuit, windings for said switches energized by current in the controlled circuit, each switch comprising a switch member arranged to be held open when the actuating current is relatively high and closed when said current falls to a predetermined value, and connections whereby each switch, except the last, in closing energizes a winding of the next switch to operate and each switch except the first causes the switch which preceded in operation to open.

17. The combination with an electric motor of a resistance in the circuit thereof and a plurality of electro-magnetic switches for cutting said resistance out of circuit each of said switches having a winding in series with the motor and a switch member controlled thereby to prevent its closing when the current is relatively high and hold it closed when the current drops to a predetermined value and connections whereby each switch member in closing to cut out a section of resistance energizes a succeeding winding and deënergizes a preceding winding.

18. In a control system, a controlled circuit, a series of switches therefor arranged to close in a predetermined order, windings for the switches energized by the current in the controlled circuit, each switch comprising a switch member arranged to be held open by its winding when the actuating current is relatively high and closed by its winding when the current falls to a predetermined value, and connections whereby one switch in closing energizes the windings of the next switch to operate and the next switch in closing causes the switch which preceded in operation to open.

19. In a control system, a circuit to be controlled, a resistance therein, a plurality of electromagnetic switches for controlling the same the first of which has its winding connected in series with the resistance, and each switch, except the last, in closing connecting the winding of the succeeding switch in the controlled circuit in series with its own winding and in a parallel circuit with a section of resistance, and connections whereby the last switch in closing connects its own winding in multiple with the resistance and the winding of the first switch.

20. In a control system, a circuit to be controlled, a resistance therein, a series of electromagnetic switches arranged to close in a predetermined order, each switch, except the last, in closing connecting the winding of the succeeding switch in the controlled circuit in series with its own winding and in a parallel circuit with a section of resistance, and connections whereby the windings of all the switches except the last are deënergized to cause the switches which they control to open so that only the last switch remains closed.

21. In a control system, a circuit to be controlled, a resistance therein, a plurality of electromagnetic switches for controlling the same one of which has its winding connected in said circuit and in closing connects the winding of the succeeding switch in series with its own winding and in a parallel circuit with a section of resistance, and connections whereby said succeeding switch in closing connects its own winding in a parallel circuit with the preceding switch winding and with a section of resistance.

22. In a control system, a circuit to be controlled, a resistance therein, a plurality of electromagnetic switches for controlling the same the first of which has its winding connected in series with the resistance and between two sections thereof, and connections whereby each switch, except the last, in closing connects the winding of the succeeding switch in series with its own winding and in a parallel circuit with a section of resistance, and the windings of all the switches except the last are deënergized whereby only the last switch remains closed.

23. In a control system, a circuit to be controlled, a resistance therein, a plurality of electromagnetic switches for controlling the same, the first of which has its winding connected in series with the resistance and each switch, except the last, in closing connecting the winding of the succeeding switch in the controlled circuit in series with its own winding, and connections whereby the last switch in closing connects its own winding in multiple with the resistance and the winding of the first switch.

24. In a control system, a circuit to be controlled, a resistance therein, a plurality of electromagnetic switches for controlling the same, one of which has its winding connected in said circuit and in closing connects the winding of the succeeding switch in series with its own winding and in a parallel circuit with a section of resistance, and connections whereby said succeeding switch in closing short circuits the preceding switch winding and a section of resistance so that the preceding switch opens and simultaneously makes a circuit for its own winding which is independent of the preceding switch.

In witness whereof, I have hereunto set my hand this 8th day of May, 1911.

EDWIN J. MURPHY.

Witnesses:
 HELEN ORFORD,
 BENJAMIN B. HULL.